United States Patent [19]

Ross et al.

[11] Patent Number: 5,229,947
[45] Date of Patent: Jul. 20, 1993

[54] HIGHWAY INFORMATION SYSTEM

[75] Inventors: Monte Ross, St. Louis; Mark L. Peterson, University City; Leonard R. Missler, Chesterfield, all of Mo.

[73] Assignee: Laser Data Technology, Inc., St. Louis, Mo.

[21] Appl. No.: 676,818

[22] Filed: Mar. 28, 1991

Related U.S. Application Data

[62] Division of Ser. No. 410,603, Sep. 21, 1989, Pat. No. 5,021,961.

[51] Int. Cl.$^5$ .............................. G06F 15/50
[52] U.S. Cl. .................... 364/443; 364/444; 73/178 R; 340/990
[58] Field of Search .......... 364/443, 444, 449, 715.02; 73/178 R; 340/988, 990, 995

[56] References Cited

U.S. PATENT DOCUMENTS

| | | | |
|---|---|---|---|
| 4,481,584 | 11/1984 | Holland | 364/443 |
| 4,546,439 | 10/1985 | Gene Esparza | 364/444 |
| 4,570,227 | 2/1986 | Tachi et al. | 364/444 |
| 4,962,457 | 10/1990 | Chen et al. | 364/443 |

Primary Examiner—Gary Chin
Attorney, Agent, or Firm—Senniger, Powers, Leavitt & Roedel

[57] ABSTRACT

A data processing device for providing data related to the categories of services available at locations along a highway in response to operator input is disclosed. The device includes a memory, a keyboard for entering input data identifying a desired service and an origin position into the memory. The input data is compressed before it is stored in the memory. The memory stores predetermined data in a compressed form related to the categories of services available at locations along the highway. The device also includes a microprocessor for retrieving from the memory the predetermined data which is a function of the input data. The microprocessor expands the retrieved compressed data into an operator readable form and provides the expanded data to a display for displaying the expanded retrieved data such as restaurants, gas stations, motels, or other services along the highway.

15 Claims, 5 Drawing Sheets

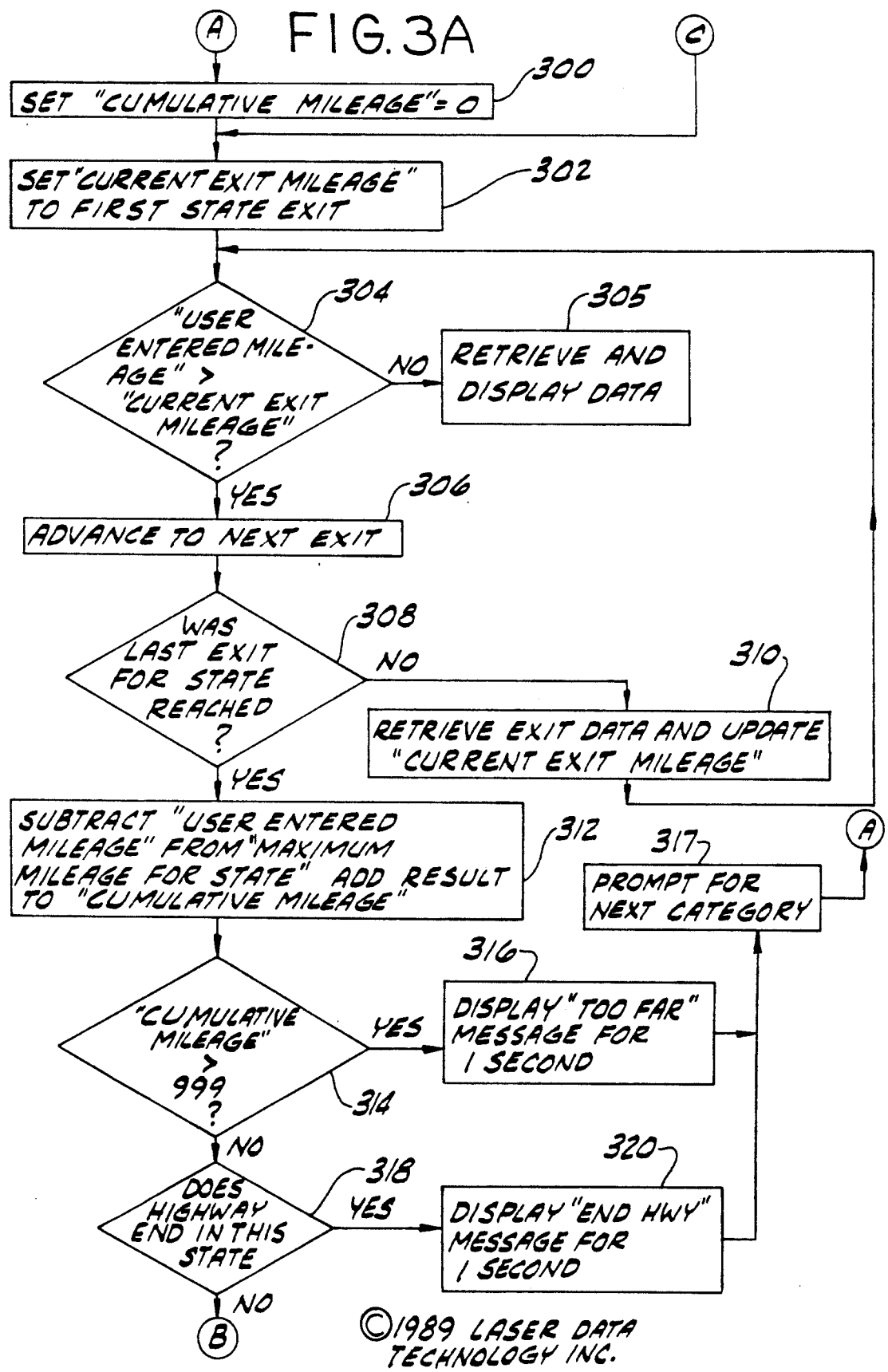

© 1989 LASER DATA TECHNOLOGY INC.

© 1989 LASER DATA TECHNOLOGY INC.

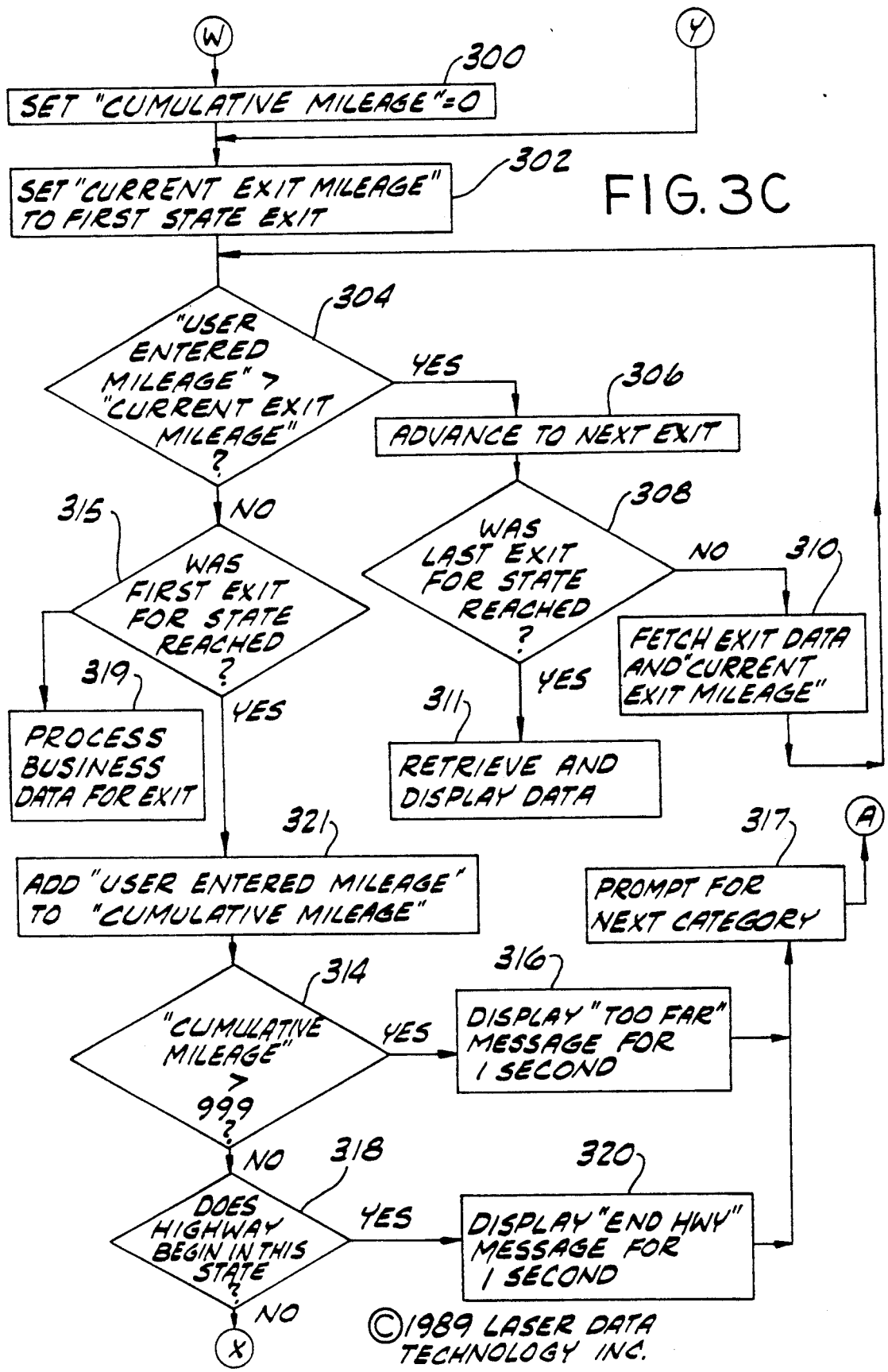

HIGHWAY INFORMATION SYSTEM

This is a division of application Ser. No. 07/410,603, filed Sept. 21, 1989 now U.S. Pat. No. 5,021,961.

BACKGROUND OF THE INVENTION

The present invention relates to a data processing device for providing data related to the types of services available at locations along a highway in response to operator input. In particular, this invention relates to a data processing device which stores data related to the types of services available at locations along a highway in a compressed form.

To determine what types of services, such as food or gas, are available at locations along a highway, one has to either depend upon billboards along the highway or leave the highway in order to locate a specific type of service. It is not unusual that a motorist may leave the highway in an attempt to locate a particular gas station or food store only to find out later that the particular station or store was only a few miles down the highway. Additionally, maps are used to locate various types of services. However, the maps may be out of date or at best contain only limited information concerning the types of services available along the highway.

In order to solve this problem, various devices have been developed which provide information relating to services available along a highway. However, these devices require different interchangeable ROM (read only memory) packs or modules be used for either different highways or different states. Since these devices are organized by highways or states, it is difficult to determine the nearest service to a border area or major intersection without frequently changing modules. This is because such devices are unable to identify services across borders. It would be advantageous to have a device which did not require separate modules to store information and changing modules when information concerning a different highway is required or when a motorist reaches a state border.

SUMMARY OF THE INVENTION

Among the objects of the present invention is the provision of a data processing device which stores data in a compressed form; the provision of such a data processing device which compresses operator entered data for comparison with the compressed data stored in the device; and the provision of such a data processing device which is capable of switching from one state to other states when a state border is reached in order to retrieve data located in the second state.

Generally, the present invention comprises a data processing device for providing data related to the categories of services available at locations along a highway in response to operator input. The device includes a memory, means for entering input data identifying a desired service and an origin position into the memory, means for compressing the input data in the memory, and means for storing data in a compressed form related to the categories of services available at locations along the highway. The device also includes means for processing the compressed input data to retrieve from the storing means the predetermined data which is a function of the input data, means for expanding the retrieved compressed data into an operator readable form, and means for displaying the expanded retrieved data.

The present invention also comprises a data processing device for providing data related to the categories of services available at locations along a highway crossing a boundary of first and second contiguous geographical areas in response to operator input. The device includes a memory, means for entering into the memory input data identifying a desired service and an origin position along the highway in the first geographical area, and means for storing first and second tables of Predetermined data of the categories of services available at selected locations in the first and second geographical areas, respectively, along the highway. The device also includes means for determining whether the closest desired service is located in the first or second geographical area, means, responsive to the means for determining, for selecting the first table if the closest desired service is located in the first geographical area and for selecting the second table if the closest desired service is located in the second geographical area, and means for retrieving from the selected table predetermined data which is a function of the input data, and means for displaying the retrieved data.

Other objects and features will be in part apparent and in part pointed out hereinafter.

BRIEF DESCRIPTION OF THE DRAWINGS

FIGS. 3A-3D are a flow chart of a program of the present invention for advancing to the exit table in the next state when the selected service is located in another state.

Corresponding reference characters indicate corresponding parts throughout the several views of the drawings.

DETAILED DESCRIPTION OF THE PREFERRED EMBODIMENT

Figure 1:
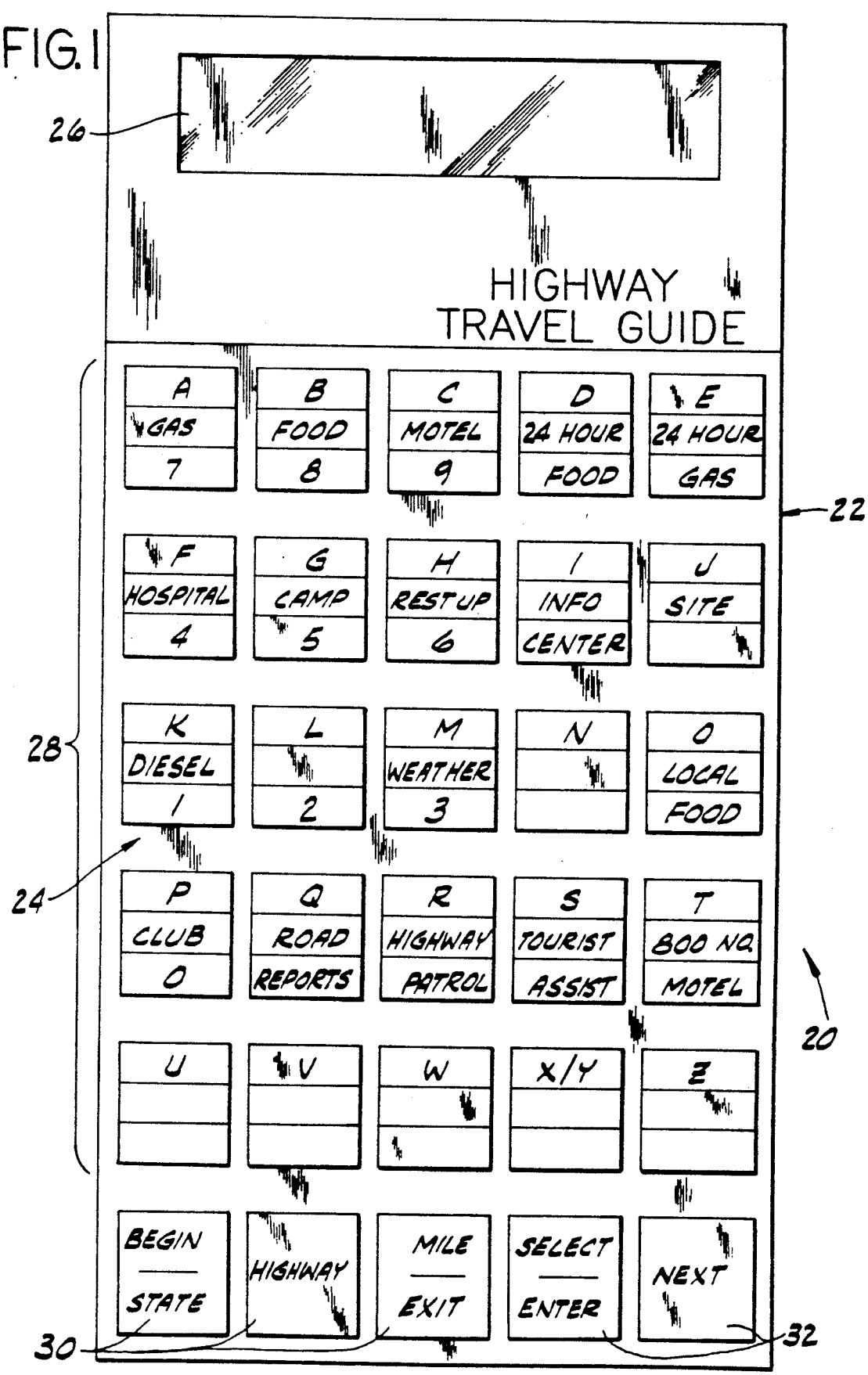
FIG. 1 is a front view of a data processing device of the present invention.

Referring now in particular to FIG. 1, the data processing device 20 is a hand held unit having a housing 22 which includes a keyboard 24 and an alphanumeric display 26. The keyboard 24 includes alphanumeric keys 28, input function keys 30, and control keys 32. The alphanumeric keys 28 are also labeled with other information such as a particular category or type of service.

Figure 2:
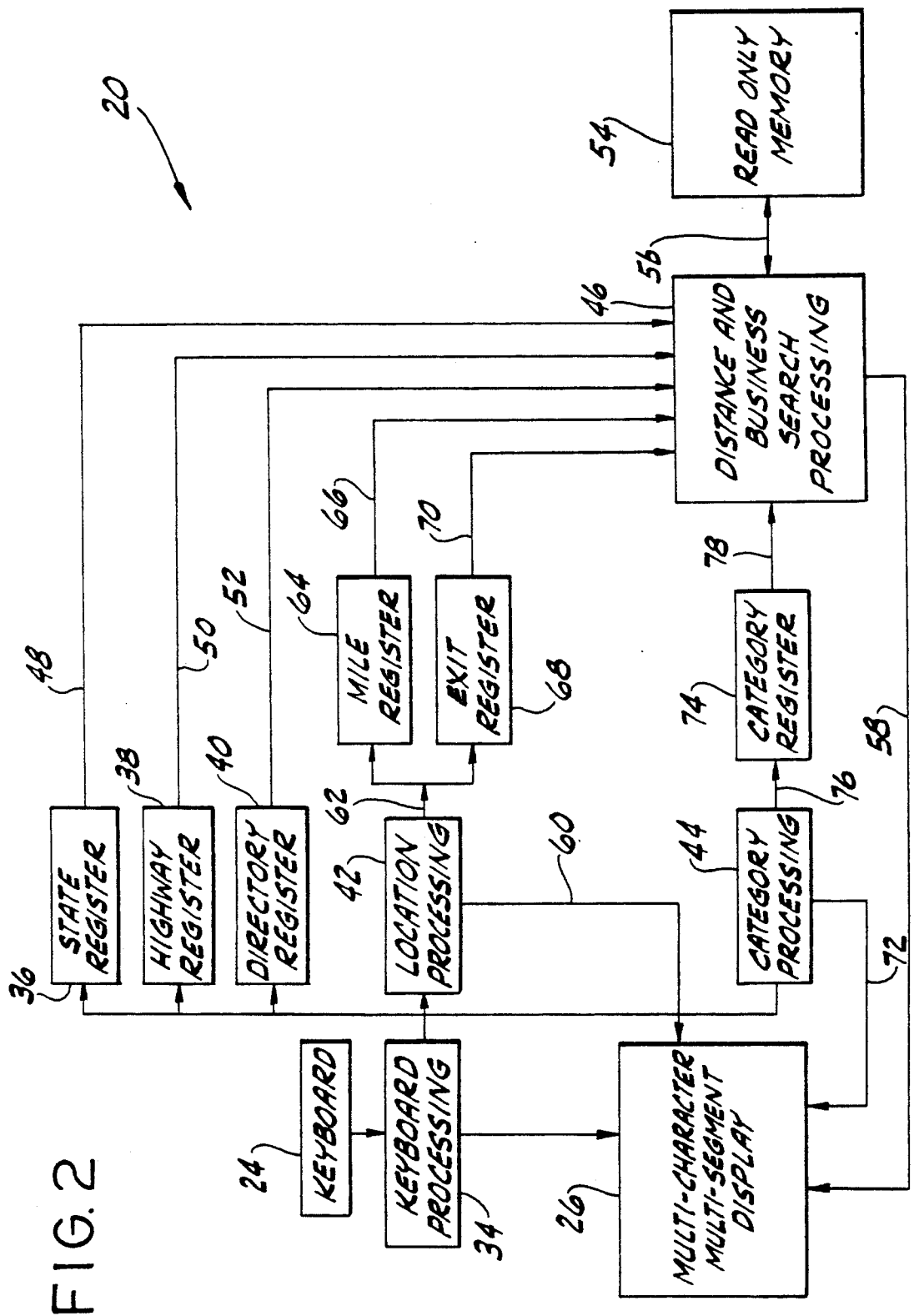
FIG. 2 is a block diagram of the data processing device shown in FIG. 1.

FIG. 2 illustrates a functional block diagram of the components of the device 20. The keyboard 24 is connected to a keyboard processor 34. The keyboard processor 34 periodically scans the keyboard to detect for the occurrence of a key depression. Upon detecting the depression of a key, the keyboard processor 34 reads in the key and provides this to both the display 26 and either a state register 36, a highway register 38, a direction register 40, a location processor 42, or a category processor 44. The state 36, the highway register 38, and the direction register 40 are connected to a microprocessor 46 via lines 48, 50, and 52, respectively. The microprocessor 46 which is particularly suitable for this invention is a NEC 7514, although there are a variety of other microprocessors which may be suitable for this invention if properly programmed and connected. The microprocessor 46 is connected to a read only memory (ROM) chip 54 via address lines 56. The ROM chip 54 is a one megabit ROM chip which is supplied by a number of chip manufacturers, such as Toshiba, NEC, and Sharp. Larger size ROM chips may be used to contain additional information. Alternatively, the predetermined data in ROM 54 and accessed by microprocessor 46 may be replaced by data stored in an EPROM. one-time programmable memory, flash memory or other similar storage device which can be accessed by microprocessor 46. The microprocessor 46 is also connected to the display 26 via line 58.

The location processor 42 is connected to the display 26 via line 60. If mileage information is entered from the keyboard 24, the location processor 42 provides this information over a line 62 to a mile register 64. The mile register 64 is connected to the microprocessor 46 via line 66. If exit information is entered from the keyboard 24, the location processor 42 provides this information over line 62 to an exit register 68. The exit register 68 is connected to the microprocessor 46 via line 70.

The category processor 44 is connected to the display 26 via line 72. The category processor 44 provides category information entered from the keyboard 24 to a category register 74 via line 76. The category register 74 is connected to the microprocessor 46 via lin 78.

In order to store in ROM 54 the large amount of data related to the types of services available at locations along the highway, the device 20 stores data in a compressed form. Data compression is implemented by use of numerous tables, pointers, and keywords. There are three major tables which are the keyword tables, the highway tables, and the exit tables. Each type of service has its own keyword table. There is a keyword table for each service listed on the keys 28 of the keyboard 24. For example, there are keyword tables for gas, food, and motels. Each keyword table contains a list of up to 63 different eight character names. Table I shows the keyword table for hotels. The first entry in the table is for HOLIDAY which represents Holiday Inn hotels, the second entry is for HOWARD for Howard Johnsons, and the last entry is for WESTIN. The numeral 255 represents that the end of the table has been reached.

TABLE I
HOTEL KEYWORD TABLE. 8 bytes per entry (H)(O)(L)(I)(D)(A)(Y)( ), first entry
(H)(O)(W)(A)(R)(D)( )( ), second entry

.
.
.

(W)(E)(S)(T)(I)(N)( )( ), last entry
(255), end of table

The highway table contains a list of all the highways in each state. Data stored in the highway table consists of the two letter state abbreviation (2 bytes) and eight characters for the state name (8 bytes) This data represents a header for each state highway table. Each state highway table also includes four characters for the highway name (4 bytes), one byte describing the highway direction and compass heading for increasing mile-/exit markers, the maximum mile marker and maximum exit number for the particular highway in the state (2 bytes), a pointer to an exit table for the highway (1 byte), and the numbers of states where the highway comes from and goes to (2 bytes). Each highway is completely described by using only 10 bytes. Table II shows the highway table for the first state listed.

TABLE II
HIGHWAY TABLE (A) (L) (A) (L) (A) (B) (A) (M) (A) ( ), Alabama highways
(a)(b)(c)(d)(CODE-A)(1sb max. mile)(1sb ET pntr)(msb ET pntr)(entrance state#)(exit state#), first entry
(a)(b)(c)(d)(CODE-A) (1sb max. mile)(1sb ET pntr)(msb ET pntr)(entrance state#)(exit state#), second entry

.
.
.

(255), end of table where (a)(b)(c)(d) is the name of the highway, and CODE-A has eight bits which are defined as follows: bit 7 represents the page for the exit table pointer, bits 4, 5, and 6 are spare, bits 2 and 3 represent the direction the operator is moving on the highway and Table IIa shows the direction designations, and bits 0 and 1 represent the most significant bits for maximum mile marker in the state and the maximum mile marker is never greater than 999.

TABLE IIa

| bit 3 | bit 2: | Highway direction definition |
|---|---|---|
| 0 | 0: | Increasing North |
| 0 | 1: | Increasing South |
| 1 | 0: | Increasing East |
| 1 | 1: | Increasing West |

The exit table stores a four byte descriptor for each exit as well as two bytes for every service at each exit. For example, if there were 244 different highways in a state, there would be 244 different exit tables, one for each highway in the state. By use of pointers, each service is completely described by compressing information into two bytes. The four byte exit header contains data relating to the number of services at this exit and the preceding exit, the exit letter code (for example, Exit 12B), and the mile marker number and exit number associated with the exit. Table III is an example of an exit table.

TABLE III
EXIT TABLE (CODE-B) (1sb exit#) (1sb mile#) (CODE-H),
first exit on highway
    (CODE-F) (CODE-G), first service
    (CODE-F) (CODE-G), second service
.
.
.
    (CODE-F) (CODE-G), last service
(CODE-B) (1sb exit#) (1sb mile#) (CODE-H),
second exit on highway
.
.
.

(255), end of table for particular highway

CODE-B includes bits 4, 5, 6, and 7 which represent the most significant bits for the number of services at the exit, bits 2 and 3 represent the most significant bits for the exit number (999 is the maximum), and bits 0 and 1 represent the most significant bits for the mile marker number (999 is the maximum). CODE-H includes bit 7 which represents the least significant bit for the number of services at the exit, bits 5 and 6 represent the exit letter, and bits 0, 1, 2, 3, and 4 represent the number of services at the preceding exit. Table IIIa shows the designations for the exit letter.

TABLE IIIa

| | Exit Letter | |
|---|---|---|
| bit 6 | bit 5: | Exit Letter |
| 0 | 0 | None |
| 0 | 1 | A |
| 1 | 0 | B |
| 1 | 1 | C |

The CODE-G and CODE-F bytes describe each service and the bytes contain the service type code number, the distance off the highway where the service is located, the direction off the highway, and the service keyword number (a pointer to the appropriate keyword table). Each service is described by using only two bytes. There are only a select list of Possible choices in each service category. For example, the fast foods service category may only include Burger King, Wendy's, and McDonald's. It takes a limited number of bits to select a name rather than the amount of memory it would take to uniquely describe the name of the service each time. If there are 30 fast food chains, each keyword can be selected by using only 5 bits. Otherwise, it could take up to 1 byte for each alphanumeric character or as much as 64 bits for an 8 character display to describe the service. The compression of data by using keywords enables a greater amount of data to be stored in the ROM 54.

CODE-G includes bits 6 and 7 which represent which direction off the highway the service is located. Table IIIb shows the designations for the direction. Bits 0-5 represent either the direction off the highway where a rest area or information center is located or the name keyword number. Table IIIc shows the designations for the directions off the highway where a rest area or information center is located.

TABLE IIIb

| | Direction Off Highway | |
|---|---|---|
| bit 7 | bit 6: | Direction Off Highway |
| 0 | 0 | N |
| 0 | 1 | S |
| 1 | 0 | E |
| 1 | 1 | W |

TABLE IIIc

| | | Direction of Rest Area | | | | |
|---|---|---|---|---|---|---|
| bit 5 | bit 4 | bit 3 | bit 2 | bit 1 | bit 0: | Direction |
| X | X | X | X | 0 | 0: | Not Allowed |
| X | X | X | X | 0 | 1: | Northbound | only exit on a N/S highway or Eastbound only exit on a E/W high way

| X | X | X | X | 1 | 0: | Southbound |
|---|---|---|---|---|---|---| only exit on a N/S highway or Westbound only exit on a E/W high way

| X | X | X | X | 1 | 1: | Exit good |
|---|---|---|---|---|---|---| for N/S bound or E/W bound traffic

CODE-F includes bits 5-7 which represent the distance off the highway the service is located and bits 0-4 represent the service type. Table IIId shows the designation for the distance off the highway for bits 5-7.

TABLE IIId

| | Distance Off the Highway | | |
|---|---|---|---|
| bit 7 | bit 6 | bit 5: | Distance off the highway |
| 0 | 0 | 0: | Zero miles |
| 0 | 0 | 1: | One mile |
| 0 | 1 | 0: | Two miles |
| 0 | 1 | 1: | Four miles |
| 1 | 0 | 0: | Eight miles |
| 1 | 0 | 1: | Twelve miles |
| 1 | 1 | 0: | Sixteen miles |
| 1 | 1 | 1: | Twenty miles |

Table IIIe shows a partial listing of the designations for the name of the service for bits 0-4.

TABLE IIIe

| | | Service Name | | | |
|---|---|---|---|---|---|
| bit 4 | bit 3 | bit 2 | bit 1 | bit 0: | Service Name |
| 0 | 0 | 0 | 0 | 0: | Food |
| 0 | 0 | 0 | 0 | 1: | Gas |
| 0 | 0 | 0 | 1 | 0: | Hospital |
| 0 | 0 | 0 | 1 | 1: | Diesel |
| . | . | | | | |
| 1 | 1 | 1 | 1 | 1: | Special use - do not use |

Miscellaneous other tables are used to store related data, such as a keyword pointer table to identify where in the ROM each keyword table is located, a display code table which is used to convert the compressed display code bits into operator identifiable characters on the display 26. Additionally, there is a state number table where for example 0 represents the state of Alabama and 49 represents the state of Wyoming. There is also included telephone number/vicinity tables for such categories as road conditions and tourist assistance which include the telephone numbers the operator may need.

The ROM 54 is divided into pages with each page containing up to 64k bytes of data. All pointers to the memory locations in the ROM 54 include a page field to specify the particular 64k byte page where the data is located.

The microprocessor 46 includes a program for operating the device 20. In operation, the program is automatically initiated upon application of power to the device 20. Application of power also results in the device 20 being reset and the initialization of all registers. The unit at first is in a low power mode with the display 26 off. Periodically, the keyboard processor 34 scans the keyboard 24 to determine if begin/state key has been pressed. Upon the detection of a pressed begin/state key, the device 20 reads in the next two pressed keys as the state code, searches the ROM 54 for the state number and stores this number in the state register 36. Next, a list of the highways in the Particular state selected is read from the ROM 54 and displayed. The operator selects the highway upon which information is to be requested. This highway number is stored in the highway register 38. The next key depression represents the direction being traveled and this is checked against data stored in the highway table in the ROM 54 to ensure consistency. The location processor 42 accepts either an exit number or a mile marker number which is entered by the operator via the keyboard 24. This data is stored in either the mile register 64 or the exit register 68 depending upon the type of data entered. Again, for consistency, the entered data is checked against data stored in the exit table in the ROM 54.

At this point, all location registers have been initialized and the device 20 is ready for the operator to request service information. The category processor 44 verifies that a valid service category has been requested. The service type code is stored in the category register 74. Once all the registers contain valid entries, the microprocessor 46 scans to the appropriate exit table in the ROM 54 to locate the requested service data. The program also includes the capability of switching to a new exit table when state boundaries are crossed.

A more detailed explanation of the program stored in the microprocessor 46 follows. The program is automatically initiated upon application of power to the device 20. A state counter register in the microprocessor 46 is initialized to 0. The display will read "STATE___" which prompts the operator to enter the two letter abbreviation for the state (for example, AZ for Arizona) in which information is to be requested. The program will then scan through the highway table to find a match. If a state is not found, then display 26 will read "ERROR", otherwise the state number will be stored in the state register 36. The program will then retrieve the next 8 characters from the highway table. The display 26 will show these 8 characters which corresponds to the state name (for example, ARIZONA). The program will wait 1 second and then display the HIGHWAY prompt. Once HIGHWAY is displayed, the operator presses the Highway key on the keyboard 24 to scroll through all the highways in the Particular state selected. Pressing the Highway key causes the program to read the next four characters from the highway table which represents the name of the highway. The next six bytes of data in the highway table are also retrieved and stored in the microprocessor 46. This provides a Pointer to the exit table for that highway. Scrolling is accomplished by pressing the Highway key until the desired highway is displayed. If the operator presses the Highway key, the next ten characters of data from the highway table are retrieved, displayed, and temporarily stored as above. When the operator scrolls to the desired highway, the Select key is pressed. As a result, the origin position of the operator has been input. Alternatively, the origin position may be input via a unit, such as a computer resident in a car, which communicates with a satellite providing position information.

The display 26 then shows "DIR_" to prompt the operator to enter which direction on the highway the operator is traveling. The operator may enter either E, W, N, or S for the direction. The program verifies that the highway actually runs in the direction selected. The direction code E, W, N, or S is displayed until the key depressed is released. The device 20 then prompts the operator to enter the mile marker number by displaying "MILE____" in display 26. The operator has the option of either entering the number of the nearest mile marker and then pressing the Select key or pressing the Mile/Exit key to enter the exit number and then pressing the Select key. If the mile marker number is entered, the device 20 verifies that the entered number is less than the maximum mileage number for the selected highway in the entered state. If not, an "INVALID" message is displayed. If the exit number is entered, the program searches through the selected highway's exit table to verify that the entered exit number is a valid exit number.

A pointer to the exit table was stored when the highway data was read from the highway table. The program uses this pointer to retrieve the first four bytes of data from the exit table. The first four bytes contain data related to the number of services at the current exit, the number of services at the preceding exit, the exit number for this exit, the mile marker number for this exit, and the exit number letter, if any. An exit number letter may be A, B, or C. If the current exit number does not match the entered exit number, then the program skips over the service data bytes for this exit and retrieves the next four bytes from the exit table. This process continues until an exit number match is found or until the end of the exit table is encountered. If no exit number match is found, then the message "NOT EXIT" is displayed.

The program then prompts the operator to select a service by displaying "CATEGORY" in the display 26. The operator selects a category. Each category key has three corresponding bytes of data stored in the ROM 54 starting at hexadecimal address 0003. The correct three bytes are found by multiplying the selected key code by 3 and adding to the 0003 address. These three bytes of data provide a pointer to the keyword tables and a service type code for the selected key. For example, if the operator selects the FOOD category key, the device displays "FOOD___" prompt and the program is pointed to the keyword table for chain restaurants.

At this point, the operator has two choices on how to proceed. The operator can either Press the Next key and the program will retrieve the name and location of the next restaurant along the highway, or enter alphabetic characters until a combination of letters has been entered which uniquely determines a restaurant name.

If the first choice is selected, the program determines whether the next exit mileage is greater than or equal to the entered mile marker number. If not, the program sequences through the highway's exit table until it finds such an exit. Service data follows the first four bytes of exit data. Each service is represented by a two byte code which provides the service type and name codes and data related to the direction off the highway and the distance from the exit. The program sequences through the service data until it finds a service that matches the selected service type. If a match cannot be found for an exit, the program advances to the next exit and continues to search for the service type. This process continues until either a match is found, the highway ends, or 999 miles from the operator's entered location has been searched.

If a match is found, the program is pointed to the start of the keyword name table for the selected service type. This table contains 8 characters of the service name. The program reads through the table until the service name corresponding to the service name code is found. The service name is then displayed for 1 second. The program then calculates the distance to the service by subtracting the operator's entered mile marker number from the service exit mileage. This result is displayed along with the state abbreviation where the service is located for 1 second. These displays alternate until the Next key is pressed or until the Select key is pressed. If the Next key is pressed, the next service of the selected service type is found and displayed in the same manner as described above. If the Select key is pressed, the device 20 displays the exit number for the selected service for 1 second and then alternately displays the direction off the highway the service is located and the distance off the highway the service is located. These displays are alternated until the Next key is pressed and the next service of the selected service is found and displayed.

If the operator decides to enter the name of a particular service, then the alphabetic keys are pressed. The display 26 blanks and the character is left justified in the display 26. The program then searches the service type keyword table to determine if one and only one service name begins with his letter. If no service name in the keyword table begins with this letter, the device displays "NO DATA" for 1 second and then displays the "CATEGORY" prompt again.

If one and only one service name in the keyword tables begins with the entered letter, this service name is displayed. The program continues in the same manner as above except that each service at an exit is checked to match the service name as well as the service type.

If more than one service name in the keyword table begins with the entered letter, the program waits until another letter is entered. This second letter is then displayed and the program searches in the same manner as in the case of the first entered letter. This process continues until a unique code is entered to select one service name from the keyword table.

Figure 3B:
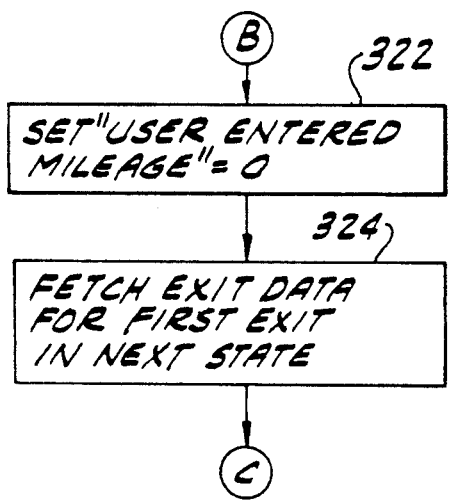

Referring now to FIGS. 3A and 3B, there is shown a flow chart of a program for advancing to the exit table in the next state when the selected service is located in another state. The program takes into account that the operator is travelling in a forward direction (successive mileage markers along the highway show increasing mileage). The program begins in a step 300 by setting a cumulative mileage register to zero. In a step 302 a current exit number register is set equal to the first exit's mileage marker number. In a next step 304 it is determined whether the operator entered mileage greater than the current exit mileage. If no, then the program branches to a step 305 to process the category selected by retrieving and displaying data. The control of the program then loops back to entry selection. If yes, then the program continues to a step 306. In step 306 the Program advances to the next exit. In a next step 308 it is determined whether the last exit for the state has been reached. If no, the program branches to a step 310 where the exit data is retrieved and the current exit mileage register is updated. The program then loops back to step 304.

If in step 308 it is determined that the last exit in the state has been reached, the program continues to a step 312. Since the last exit in the state has been reached, the operator has requested exit data in the next contiguous state. The cumulative mileage register is set equal to the mileage at the boundary or border between the states less the operator entered initial location mileage. Within the second state, the distance from the operator's initial location to a desired exit is the exit's mileage plus the cumulative mileage register.

In a next step 314, it is determined whether the value in the cumulative mileage register is greater than 999. If it is then the program branches to a step 316 where a "TOO FAR" message is displayed for 1 second in the display 26. The program, in a step 317, then prompts for a next category to be entered or selected by the operator. After a new category has been entered the program loops back to point A. If the cumulative mileage register is less than 999 then the program continues to a step 318. In step 318 it is determined whether the highway ends in the current state. If it does then the program branches to a step 320 where a "END HWY" message is displayed for 1 second. The program then prompts the operator for a next category to be entered or selected by the operator in step 317. If the highway does not end in the state the program continues to a point B in FIG. 3B. At point B the program continues to a step 322. In step 322 a user entered mileage register is set to zero. The program continues to a step 324 where the exit data for the first exit in the next state is retrieved. The program continues to a point C which loops control of the program back to step 302 in FIG. 3A.

Figure 3D:
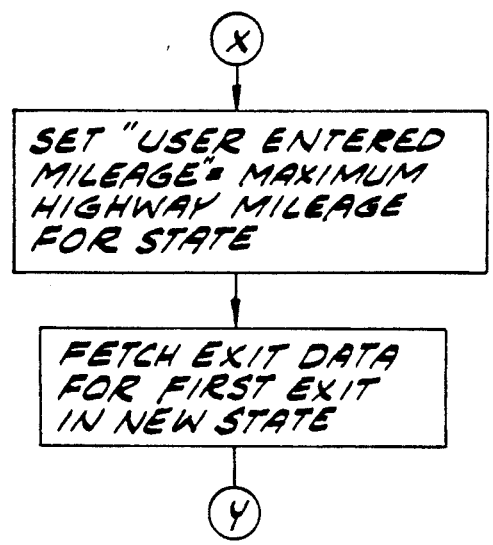

Referring now to FIGS. 3C and 3D, there is shown a flow chart of a program for advancing to the exit table in the next state when the selected service is located in another state. The program takes into account that the operator is travelling in a reverse direction (successive mileage markers along the highway show decreasing mileage). The program begins in a step 300 by setting a cumulative mileage register to zero. In a step 302 a current exit number register is set to the mileage marker number of the first exit. In a next step 304 it is determined whether the operator entered mileage greater than the current exit mileage. If yes, then the program branches to a step 306. In step 306 the program advances to the next exit. In a next step 308 it is determined whether the last exit for the state has been reached. If no, the program branches to a step 310 where the exit data is retrieved and the current exit mileage register is updated. The program then loops back to step 304.

If in step 308 it is determined that the last exit in the state has been reached, the program branches to step 311 to process the category selected by retrieving and displaying data. The control of the program then loops back to entry selection.

If in step 304 it is determined that the user entered mileage is not greater than the current exit mileage then the program branches to a step 315. In step 315 it is determined whether the first exit for the next step has been reached. If no, then the program branches to a step 319 to retrieve and display data for the exit. The control of the program then loops back to entry selection.

Since the first exit in the state has been reached, the operator has requested exit data in the next contiguous state and the program branches to a step 321. In step 321 the cumulative mileage register is set equal to the distance from the user location (origin position) to the boundary or border between the states.

In a next step 314, it is determined whether the value in the cumulative mileage register is greater than 999. If it is then the program branches to a step 316 where a "TOO FAR" message is displayed for 1 second in the display 26. The program, in a step 317, then prompts for a next category to be entered or selected by the operator. After a new category has been entered the program loops back to point W. If the cumulative mileage register is less than 999 then the program continues to a step 318. In step 318 it is determined whether the highway begins in the current state. If it does then the program branches to a step 320 where a "END HWY" message is displayed for 1 second. The program then prompts the operator for a next category to be entered or selected by the operator in step 317. If the highway does not begin in the state the program continues to a point X in FIG. 3D. At point X the program continues to a step 325. In step 325 a user entered mileage register is set to the maximum highway mileage for the state. The program continues to a step 324 where the exit data for the first exit in the next state is retrieved. The program continues to a point Y which loops control of the program back to step 302 in FIG. 3C.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A data processing device for providing data related to the categories of services available at locations along a highway in response to operator input, the device comprising:

a memory including a data register;
   means for entering one or more entries of input data identifying a desired service and an origin position into the data register of the memory;
   means for compressing the input data in the data register of the memory by assigning to each entry of the input data a key word having less bits than the entry;
   means for storing predetermined data in a compressed format relating to the types of services available at locations along the highway wherein the predetermined data comprises key words;
   means for comparing the compressed input data to the compressed predetermined data in the storing means for identifying one or more key words of the compressed predetermined data in the storing means which directly corresponds to the compressed input data;
   means for selectively retrieving from the storing means the one or more key words of the compressed predetermined data which directly corresponds to the compressed input data;
   means for expanding the retrieved compressed predetermined data into an operator readable form; and
   means for displaying the expanded retrieved data.

2. The device of claim 1 further comprising means for scrolling the displaying means to display highways corresponding to the origin position.

3. The device of claim 2 wherein the entering means includes means for entering the name of a state and the compressing means comprises means for converting the name of the state into a coded number.

4. The device of claim 1 wherein the entering means includes means for entering the name of a state and the compressing means comprises means for converting the name of the state into a coded number.

5. The device of claim 1 wherein the retrieved compressed data includes a coded number and the expanding means comprises means for converting the coded number into a name.

6. The device of claim 1 wherein said means for storing stores data relating to the types of brand name services available at locations along the highway.

7. The device of claim 1 wherein the means for retrieving retrieves data relating to the closest desired service to the origin position.

8. The device of claim 7 further comprising means for calculating distance data relating to the distance between the closest desired service and the origin position and wherein said means for displaying selectively displays the calculated distance data.

9. The device of claim 7 wherein the means for retrieving alternatively retrieves data relating to the next closest desired service to the origin position.

10. A data processing device for providing data related to categories of services available at locations along a highway in response to operator input, the device comprising:

a memory;
    means for entering one or more entries of input data relating to a state, a highway, a direction, a location, and a category into the memory;
    a state register for storing the entered state;
    a highway register for storing the entered highway;
    a direction register for storing the entered direction;
    a location register for storing the entered location;
    a category register for storing the entered category;
    means for storing predetermined compressed, key word data related to categories of services available at locations along the highway;
    means for compressing the input data stored in the memory by assigning to each entry of the input data a key word having less bits than the entry:
    means for comparing the compressed input data to the predetermined compressed, key word data for identifying predetermined compressed data which is the closest data corresponding to the entered input data relating to state, highway, direction, and location;
    means for selectively retrieving from the storing means the predetermined compressed data which is the closest data corresponding to the entered input data relating to state, highway, direction, and location;
    means for expanding the retrieved compressed, key word data into an operator readable form; and
    means for displaying the retrieved data.

11. The device of claim 10 wherein the compressing means comprises means for converting the name of the state into a coded number.

12. The device of claim 10 wherein the retrieved compressed data includes a coded number and the expanding means comprises means for converting the coded number into a name.

13. The device of claim 10 wherein the location register further comprises a mileage register and an exit register.

14. The device of claim 10 wherein the entering means includes means for entering the name of a state and the compressing means comprises means for converting the name of the state into a coded number.

15. A data processing device for providing data related to the categories of services available at locations along a highway in response to operator input, the device comprising:

a memory
    means for entering one or more entries of input data identifying a desired service and an origin position into the memory;
    means for compressing the input data in the memory by assigning to each entry of the input data a key word having less bits than the entry;
    means for storing predetermined data in a compressed format relating to the types of services available at locations along the highway wherein the predetermined data comprises key words;

means for comparing the compressed input data to the compressed predetermined data for identifying one or more key words of the compressed predetermined data which directly corresponds to the compressed input data means for selectively retrieving from the storing means the one or more key words of the compressed predetermined data which directly corresponds to the compressed input data;

means for expanding the retrieved compressed predetermined data into an operator readable form;

means for displaying the expanded retrieved data; and wherein the entering means includes means for inputting a direction of travel of the operator and wherein the retrieving means is responsive to the inputting means for retrieving compressed predetermined data corresponding to the direction of travel input by the operator.

* * * * *